United States Patent
Mizoguchi

(10) Patent No.: US 11,952,939 B2
(45) Date of Patent: Apr. 9, 2024

(54) WASTE GATE VALVE CLOSING CONTROL

(71) Applicant: TOYOTA JIDOSHA KABUSHIKI KAISHA, Toyota (JP)

(72) Inventor: Hiroaki Mizoguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 18/048,204

(22) Filed: Oct. 20, 2022

(65) Prior Publication Data

US 2023/0126020 A1 Apr. 27, 2023

(30) Foreign Application Priority Data

Oct. 25, 2021 (JP) .................... 2021-173826

(51) Int. Cl.
*F02B 37/18* (2006.01)
*F02D 41/00* (2006.01)
*F02D 41/08* (2006.01)

(52) U.S. Cl.
CPC ........ *F02B 37/183* (2013.01); *F02D 41/0007* (2013.01); *F02D 41/086* (2013.01); *F02D 41/083* (2013.01); *F02D 2200/023* (2013.01); *F02D 2200/703* (2013.01)

(58) Field of Classification Search
CPC .... F02B 37/183; F02D 41/083; F02D 41/086; F02D 2200/023; F02D 2200/703
USPC .......................................................... 123/564
See application file for complete search history.

(56) References Cited

U.S. PATENT DOCUMENTS 10,683,797 B2 * 6/2020 Morikawa ............. F01D 17/105
2017/0328263 A1 * 11/2017 Uhrich ................... F02M 26/06

FOREIGN PATENT DOCUMENTS

JP 2017-203527 A 11/2017

* cited by examiner

*Primary Examiner* — Jorge L Leon, Jr.
(74) *Attorney, Agent, or Firm* — Oblon, McClelland, Maier & Neustadt, L.L.P.

(57) ABSTRACT

The valve closing control is performed to close the waist gate valve of the turbocharger when the hydraulic fluid temperature is less than the temperature threshold. By closing the waist gate valve, the output torque is increased by increasing the amount of air taken into the engine that is idling operation, to suppress the engine stall that may occur when switching from the non-driving range to the driving range.

3 Claims, 3 Drawing Sheets

WASTE GATE VALVE CLOSING CONTROL

CROSS-REFERENCE TO RELATED APPLICATIONS

The present disclosure claims priority to Japanese Patent Application No. 2021-173826 filed Oct. 25, 2021, which is incorporated herein by reference in its entirety including specification, drawings and claims.

TECHNICAL FIELD

The present disclosure relates to a vehicle, and more particularly to a vehicle including an engine with a turbocharger and an automatic transmission.

BACKGROUND

Conventionally, as this type of vehicle, those to suppress engine stall that may occur when switched from the non-drive range to the drive range by the shift lever has been proposed (e.g., see Patent Document 1). In this vehicle, the modulator pressure regulated by the modulator valve is supplied to the torque converter when switched from the non-driving range to the driving range. Thus, compared with the case where high-pressure hydraulic pressure such as line pressure is supplied to the torque converter, the creep torque generated in the lock-up clutch is reduced, and suppresses the engine stall that occurs when switched from the non-driving range to the driving range.

CITATION LIST

Patent Literature

PTL 1: JP2017-203527

SUMMARY in the vehicle equipped with an engine with a turbocharger and an automatic transmission, engine stall may occur when switching from a non-drive range to a drive range at low temperatures in high altitudes. In an engine with a turbocharger, the amount of exhaust is smaller than that of an engine without a turbocharger of the same output, so that air sucked into the engine running at idling is reduced at high altitudes. In the engine with the turbocharger, the amount of exhaust is smaller than that of an engine without a turbocharger of the same output, so that air taken into the engine while idling operation is reduced at high altitudes. Therefore, the output torque from the engine in idling operation is reduced. Further, at low temperatures, the friction torque of the torque converter in the automatic transmission increases. Therefore, at a low temperature in a high altitude, when switching the shift position from the non-driving range to the driving range while idling operation of the engine having a turbocharger, the output torque from the engine cannot be sufficiently exceeded the friction torque of the torque converter, the engine may be stalled.

The vehicle of the present disclosure is primarily intended to inhibit engine stall when switching the shift position from the non-drive range to the drive range at low temperatures in high altitudes.

In order to achieve the above main object, the vehicle of the present disclosure is implemented by the following aspects.

A vehicle of the present disclosure including: an engine having a turbocharger; an automatic transmission configured to shift power from the engine and output to a drive shaft connected to drive wheels; a controller configured to control the engine and the automatic transmission, wherein the turbocharger includes: a compressor mounted in an intake pipe; a turbine mounted in an exhaust pipe; a bypass pipe mounted such that bypasses the turbine to the exhaust pipe; and a waste gate valve mounted in the bypass pipe; wherein the controller executes valve closing control for closing the waste gate valve when the temperature of the hydraulic fluid is less than a temperature threshold.

In the vehicle of the present disclosure, a turbocharger including a compressor mounted in an intake pipe, a turbine mounted in an exhaust pipe, a bypass pipe mounted such that bypasses the turbine to the exhaust pipe, and a waste gate valve mounted in the bypass pipe. Then, a controller performs the valve closing control for closing the waste gate valve when the temperature of the hydraulic oil is less than the temperature threshold. When the waste gate valve is closed, the exhaust does not flow into the bypass pipe, and the turbine is rotated by the exhaust, and the rotation of the compressor connected to this turbine increases the amount of suction air. Thus, the output torque of the engine in idling operation is increased, so that it sufficiently exceeds the friction torque of the torque converter having the automatic transmission. As a result, it is possible to suppress engine stall that may occur when switching from the non-driving range to the driving range while the engine is idling.

DETAILED DESCRIPTION OF EMBODIMENTS

Next, embodiments for carrying out the present disclosure will be described using examples.

Figure 1:
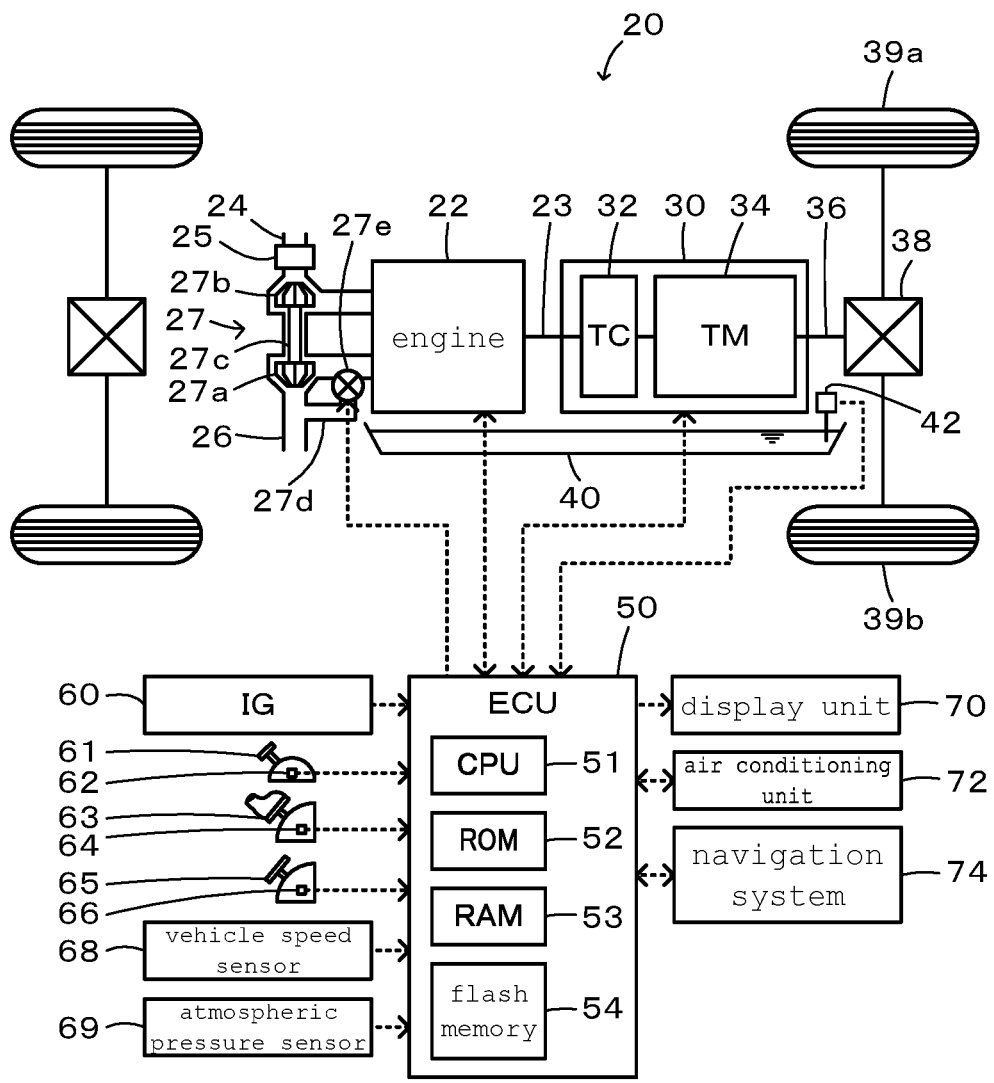
FIG. 1 is a schematic diagram showing a configuration of the vehicle 20.

FIG. 1 is a schematic diagram showing a configuration of the vehicle 20. As illustrated, the vehicle 20 of the embodiment includes an engine 22, an automatic transmission 30, the electronic control unit (electronic controller) 50, an air conditioner 72, and a navigation system 74.

The engine 22 is configured as an internal combustion engine which is driven by using a hydrocarbon fuel such as gasoline or light oil, for example, and an output shaft 23 thereof is connected to the automatic transmission 30. The engine 22 comprises a turbo-type turbocharger (so-called turbocharger) 27 which uses exhaust gas.

The turbocharger 27 includes a compressor 27b disposed in the intake pipe 24 connected to the air cleaner 25, a turbine 27a disposed in the exhaust pipe 26, a connecting shaft 27c connecting the compressor 27b and the turbine 27a, a waste gate valve 27e disposed in the bypass pipe 27d communicating the upstream side and downstream side of the turbine 27a in the exhaust pipe 26. In the turbocharger 27, the controller adjusts the opening degree of the waste gate valve 27e, the distribution ratio between the amount of exhaust gas flowing through the turbine 27a and the amount of exhaust gas flowing through the bypass pipe 27d is adjusted (the smaller the opening degree of the waste gate valve 27e, the amount of exhaust gas flowing through the bypass pipe 27d is reduced and the amount of exhaust gas flowing through the turbine 27a is increased), the rotation driving force of the turbine 27a is adjusted, the compressed air amount by the compressor 27b is adjusted, the supercharging pressure of the engine 22 (intake pressure) is adapted to be adjusted. Incidentally, the engine 22 is operable when the waste gate valve 27e is fully opened in the same manner as a natural intake type engine without the turbocharger 27.

The automatic transmission 30 includes a torque converter 32 and an automatic transmission 34. The torque converter 32 is configured, for example, as a known torque converter with a fluidic lock-up clutch. The automatic transmission 34 is configured, for example, as a transmission of the reverse one stage in the forward six stages of the hydraulic drive. The output shaft of the automatic transmission 34 is connected to a drive shaft 36 which is connected to the drive wheels 39a and 39b via a differential gear 38.

The electronic controller 50 is configured as a microprocessor centered around a CPU 51, and includes, in addition to the CPU 51, a ROM 52 that stores programs, a RAM 53 that temporarily stores data, a flash memory 54 that stores data, and input and output ports not illustrated.

Signals from various sensors are input into the electronic controller 50 through the input port. Examples of the signals input into the electronic controller 50 include an ignition signal from an ignition switch 60, a shift position SP from a shift position sensor 62 for detecting an operation position of a shift lever 61, an accelerator opening degree Acc from an accelerator pedal position sensor 64 for detecting an amount of depression of an accelerator pedal 63, and a brake pedal position BP from a brake pedal position sensor 66 for detecting an amount of depression of a brake pedal 65. Further, a vehicle speed V from a vehicle speed sensor 68, an atmospheric pressure Pa from an atmospheric pressure sensor 69, and an oil temperature Toil from a temperature sensor 42 attached to an oil pan 40 storing lubricating oil that lubricates the engine 22 and automatic transmission 30, and the like are included.

Various control signals are output from the electronic controller 50 through the output port. Examples of the control signals output from the electronic controller 50 include a throttle control signal for operating and controlling the engine 22, a fuel injection control signal, an ignition control signal, a drive control signal to the wastegate valve 27e, and a drive control signal to the automatic transmission 30. Also, a display control signal to the display unit 70 mounted near the driver's seat, an air conditioning control signal to the air conditioning unit 72 that harmonizes the air in the passenger compartment, and the like are included.

Figure 2:
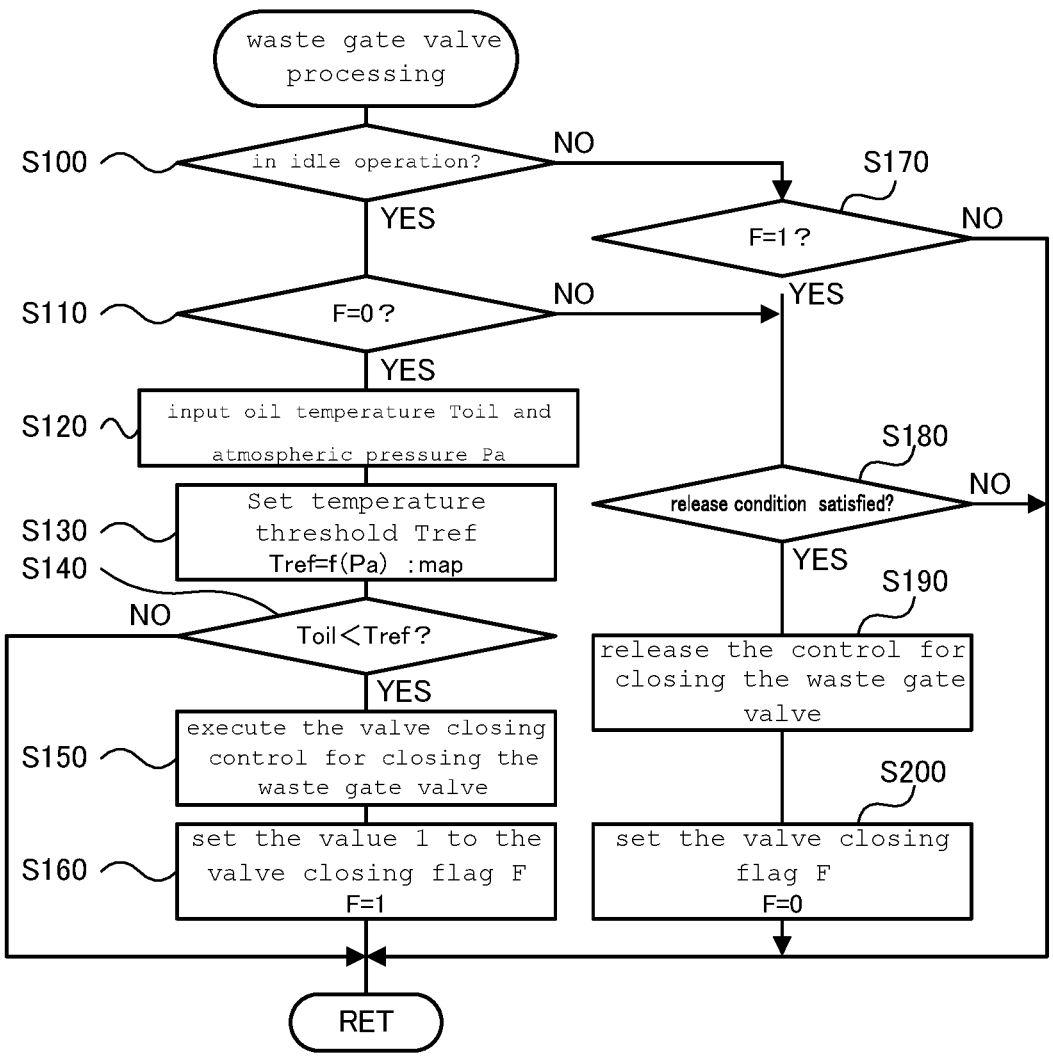
FIG. 2 is a flowchart showing an example of a waste gate valve processing executed by an electronic control unit (electronic controller) 50.

Next, the operation of the vehicle 20 of the embodiment configured as described above, particularly, the operation at a low temperature on a high altitude, will be described. The low temperature is, for example, 0° C. or less, −10° C. or less, or −20° C. or less. FIG. 2 is a flowchart showing an example of the waste gate valve processing performed by the electronic control unit 50. This process is repeatedly executed every predetermined time.

When the waste gate valve processing is executed, the electronic control unit 50 first determines whether or not the engine 22 is in an idle operation (step S100). When the engine 22 is determined to be in an idling operation, the electronic control unit 50 determines whether the valve closing flag F value is 0 or not (step S110). The valve closing flag F is a flag to be set by the waste gate valve processing, the value 0 is set when the control for closing the waste gate valve 27e (valve closing control) is not executed, the value 1 is set when the valve closing control is executed. The value 0 is set as the initial value of the valve closing flag F.

Figure 3:
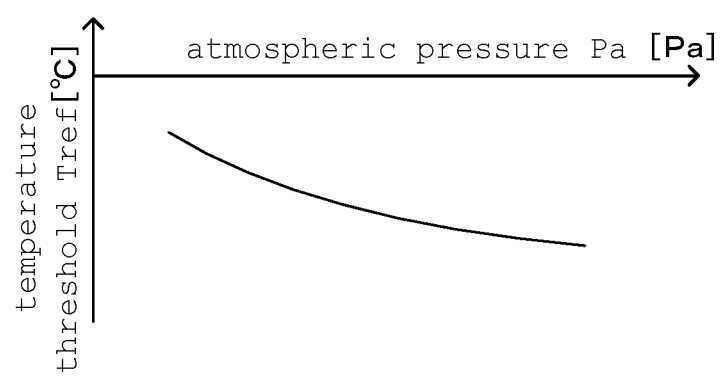
FIG. 3 is one example of temperature threshold setting map.

When the valve closing flag F in step S110 is determined to be a value 0, the electronic control unit 50 inputs the data required for processing such as atmospheric pressure Pa and oil temperature Toil from the atmospheric pressure sensor 69 and the temperature sensor 42, respectively (step S120). The temperature threshold Tref is set based on the atmospheric pressure Pa (step S130). Temperature threshold Tref, the relationship between the atmospheric pressure Pa and the temperature threshold Tref in the embodiment is predetermined and stored in ROM 52 or the like as a temperature threshold setting map and the atmospheric pressure Pa is given, is set by deriving the corresponding temperature threshold Tref from, the map. FIG. 3 shows an example of a map for setting the temperature threshold. As shown, the temperature threshold Tref, in the embodiment, the temperature threshold Tref is set to be higher as the atmospheric pressure Pa is smaller. This is based on the fact that the smaller the atmospheric pressure Pa, the smaller the amount of air taken into the engine 22. As the threshold temperature Tref, for example, a temperature of 0° C. or less can be used.

When the temperature threshold Tref is set, the electronic control unit 50 determines whether or not the oil temperature Toil is less than the temperature threshold Tref (step S140). When the oil temperature Toil is determined not to be less than the temperature threshold Tref (which is equal to or greater than the temperature threshold Tref), the electronic control unit 50 determines the control for closing the waste gate valve 27e (valve closing control) to be unnecessary, and terminates the process. On the other hand, when the oil temperature Toil is determined to be less than the temperature threshold Tref, the electronic control unit 50 executes the valve closing control for closing the waste gate valve 27e (step S150), and the electronic control unit 50 sets the value 1 to the valve closing flag F (step S160), and terminates the process. By closing the waste gate valve 27e in this way, the exhaust does not flow to the bypass pipe 27d, the turbine 27a is rotated by the exhaust, the rotation of the compressor 27b connected to the turbine 27a is urged, and the amount of air taken into the engine 22 is increased. Therefore, the output torque of the engine 22 that is idling is increased, and the output torque of the engine 22 is sufficiently larger than the friction torque of the torque converter 32 that the automatic transmission has. As a result, the engine 22 is restrained from engine stall when the shift lever 61 is switched from the non-driving range (parking position (P range) or neutral position (N range)) to the driving range (reverse position (R range) or drive position (D range)) during the idling operation of the engine 22.

When the engine 22 in the step S100 is determined not to be idling operation, the electronic control unit 50 determines whether the valve closing flag F value is 1 or not (step S170). When it is determined that the valve closing flag F is not the value 1 (the value 0), the electronic control unit 50 determines that the valve closing control is not executed, and terminates the present process.

On the other hand, when the valve closing flag F in step S170 is determined to be a value 1, it is determined whether the release condition for releasing the valve closing control is satisfied (step S180). For example, the following conditions are the release conditions of the valve closing control; a predetermined time after starting the valve closing control (e.g., oil temperature Toil is sufficient time to exceed the temperature threshold Tref or the like) has elapsed: the required load to the engine 22 reaches or exceeds a predetermined load (such as 50% and 60% of the maximum load); and the oil temperature Toil reaches or exceeds the temperature threshold Tref, it is possible to determine that the release condition of the valve closing control is satisfied when any one of these conditions is met. When the electronic control unit 50 determines that the release condition for releasing the valve closing control is not satisfied, the present process is terminated. On the other hand, when it is determined that the release condition for releasing the valve closing control is satisfied, the electronic control unit 50 releases (ends) the control for closing the waste gate valve 27e (valve closing control) (step S190), and sets the value 0 to the valve closing flag F (step S200), and terminates the process. Thus, excessive valve closing control can be suppressed.

When it is determined in step S110 that the valve closing flag F is not the value 0 (value 1), it is determined whether or not the release condition for releasing the valve closing control is established (step S180), when it is determined that the release condition for releasing the valve closing control is not established, this processing is terminated, and when it is determined that the release condition for releasing the valve closing control is established, the valve closing control is released (end) (step S190), the value 0 is set in the valve closing flag F (step S200), and this processing is terminated. Thus, it is possible to suppress the excessive valve closing control even during idling operation of the engine 22.

In the vehicle 20 of the embodiment described above, when the oil temperature Toil is less than the set temperature threshold Tref based on the atmospheric pressure Pa during the idling operation of the engine 22, the electronic control unit 50 executes the valve closing control for closing the waste gate valve 27e. Thus, it is possible to suppress the engine 22 engine stall that may, occur when switching the shift lever 61 from the non-driving range to the driving range while idling the engine 22 at a low temperature in a high altitude. Further, when the release condition for releasing the valve closing control is satisfied while executing the valve closing control, the electronic control unit 50 releases the valve closing control for closing the waste gate valve 27e. Thus, excessive valve closing control can be suppressed.

In the vehicle 20 of the embodiment, the electronic control unit 50 performs the valve closing control for closing the waste gate valve 27e when the oil temperature Toil is less than the temperature threshold Tref set based on the atmospheric pressure Pa during the idling operation of the engine 22. However, the oil temperature Toil is less than a threshold value during idling operation of the engine 22, and the valve closing control for closing the waste gate valve 27e may be performed when the atmospheric pressure Pa is less than a threshold value, or the valve closing control for closing the waste gate valve 27e may be performed regardless of the atmospheric pressure Pa when the oil temperature Toil is less than a threshold value during the idling operation of the engine 22.

In the vehicle of the present disclosure, the controller may set the temperature threshold to be higher as the atmospheric pressure is smaller compared to when the atmospheric pressure is greater. In this way, it is possible to correspond to the atmospheric pressure even at low temperatures in the high altitude.

In the vehicle of the present disclosure, the controller may terminate the valve closing control when any one of following conditions is satisfied: a predetermined time has elapsed from the start of the valve closing control, a required load to the engine reaches or exceeds a predetermined load, and the oil temperature reaches or exceeds the temperature threshold. This suppresses excessive valve closing control.

The following describes the correspondence relationship between the primary components of the embodiment and the primary components of the disclosure described in Summary. In the embodiment, the turbocharger 27 corresponds to a "turbocharger", the engine 22 corresponds to an "engine", the automatic transmission 30 corresponds to an "automatic transmission", and the electronic control unit 50 corresponds to a "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the vehicle and so on.

The invention claimed is:

1. A vehicle comprising:
an engine;
a controller configured to control the engine; and
a turbocharger including:
  a compressor mounted in an intake pipe of the engine;
  a turbine mounted in an exhaust pipe of the engine;
  a bypass pipe connected to the exhaust pipe so as to bypass the turbine; and
  a waste gate valve mounted in the bypass pipe,
wherein, during an idling operation of the engine, the controller executes a valve closing control configured to close the waste gate valve when a temperature of an operating oil of the engine is less than a temperature threshold, and
wherein the controller sets the temperature threshold so as to vary inversely with atmospheric pressure.

2. The vehicle according to claim 1,
wherein the controller terminates the valve closing control when:
  a predetermined time has elapsed from a start of the valve closing control,
  a required load to the engine is greater than or equal to a predetermined load, or
  the temperature of the operating oil is greater than or equal to the temperature threshold.

3. The vehicle according to claim 1, further comprising:
an automatic transmission configured to shift power from the engine and output to a drive shaft connected to drive wheels,
wherein the controller is further configured to control the automatic transmission.

* * * * *